（12）United States Patent
Curtis et al.

(10) Patent No.: US 8,806,543 B1
(45) Date of Patent: Aug. 12, 2014

(54) IN-FLIGHT PASSENGER INFORMATION SYSTEM

(71) Applicant: The Boeing Company, Chicago, IL (US)

(72) Inventors: Vicki Ann Curtis, Stanwood, WA (US); Menaka Apana, Cincinnati, OH (US); Peizhong Xu, Cincinnati, OH (US); Lixia Zhang, Cincinnati, OH (US); Joel Vanboening, Wymore, NE (US); Sooshin Choi, Cincinnati, OH (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 13/784,928

(22) Filed: Mar. 5, 2013

(51) Int. Cl.
H04N 7/18 (2006.01)

(52) U.S. Cl.
USPC ............... 725/75; 725/76; 725/77; 348/837; 348/838; 297/217.3; 244/118.6

(58) Field of Classification Search
USPC ........................................................ 725/75
See application file for complete search history.

(56) References Cited

U.S. PATENT DOCUMENTS

2005/0278753 A1* 12/2005 Brady et al. ............... 725/76
2011/0219408 A1* 9/2011 Frisco et al. ............... 725/77

FOREIGN PATENT DOCUMENTS

EP 0533310 B1 1/1996

* cited by examiner

Primary Examiner — Kunal Langhnoja
(74) Attorney, Agent, or Firm — Yee & Associates, P.C.

(57) ABSTRACT

A method and apparatus for displaying in-flight passenger information. In-flight passenger information for flight of an aircraft is identified during operation of the aircraft. A timeline and the in-flight passenger information in association with the timeline are displayed on a display system during the operation of the aircraft.

16 Claims, 10 Drawing Sheets

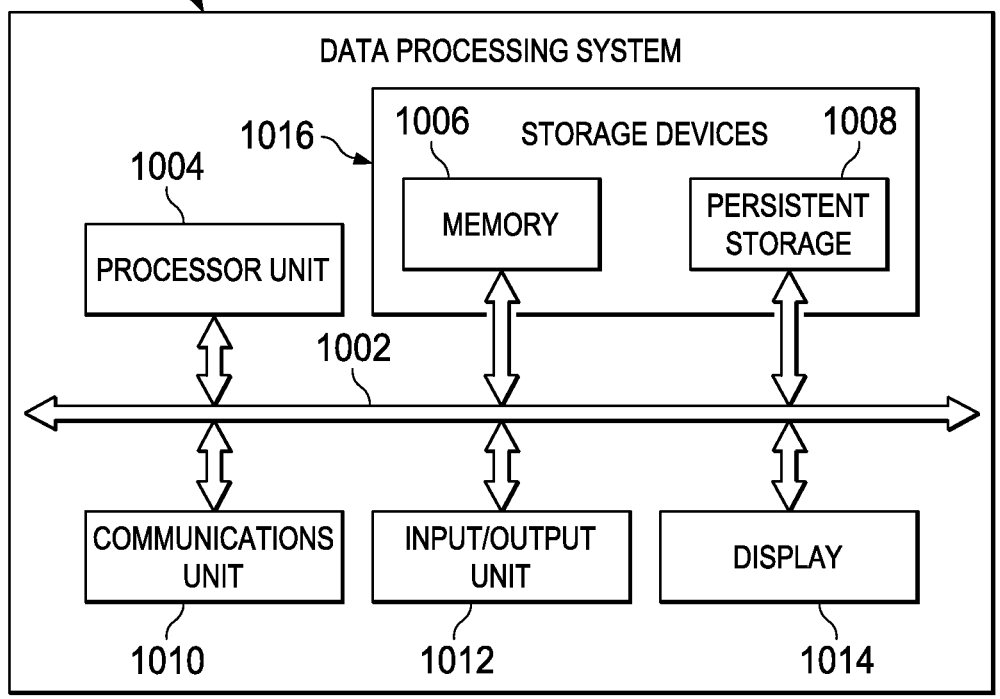
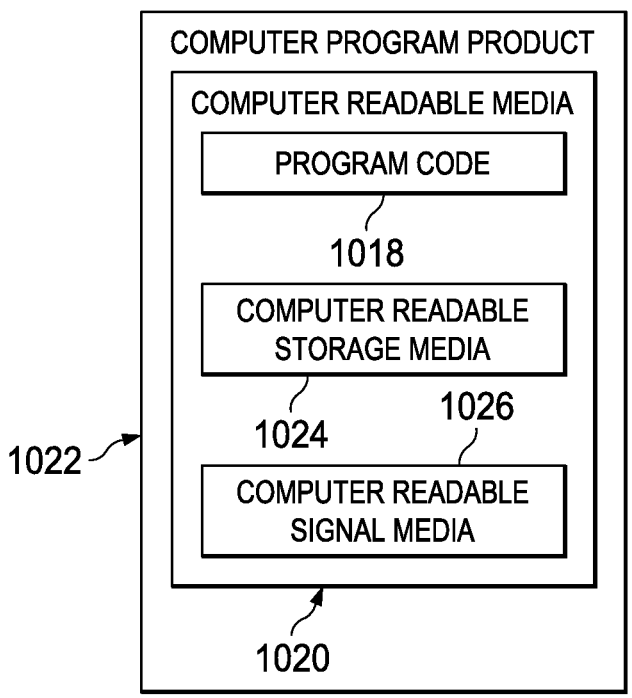
FIG. 10

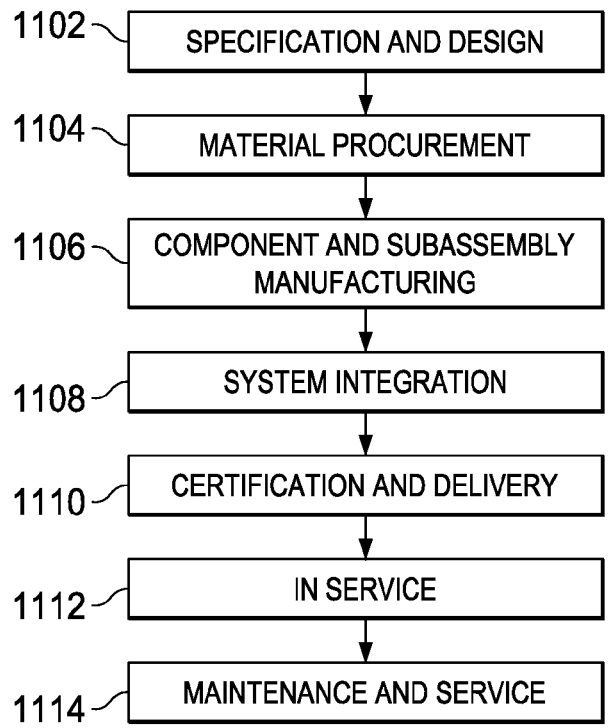
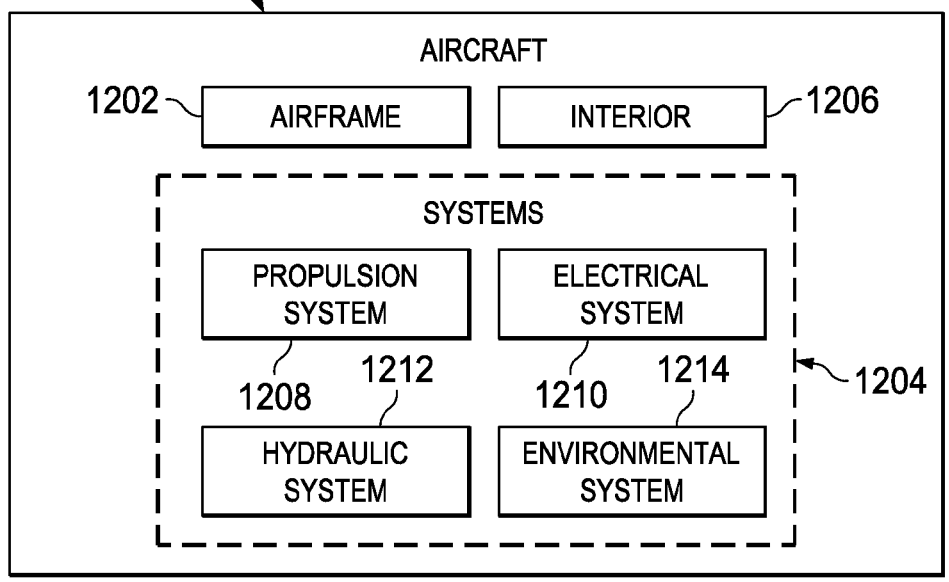

IN-FLIGHT PASSENGER INFORMATION SYSTEM

BACKGROUND INFORMATION

1. Field

The present disclosure relates generally to aircraft and, in particular, to information systems for aircraft. Still more particularly, the present disclosure relates to a method and apparatus for providing passenger information during the operation of an aircraft.

2. Background

A passenger cabin of an aircraft may provide various amenities to passengers. For example, different classes of seating may have different amounts of room and comfort with respect to seats for passengers. Some classes of seats may even allow passengers to fully recline into flat beds on long flights.

Other amenities may include power outlets, food service, lounge areas, and other suitable amenities. The amenities present may vary for different levels of service in the passenger cabin.

Another amenity that is present in many passenger cabins is an in-flight entertainment system. Within the in-flight entertainment system, passengers may view movies, view television shows, listen to music, access the Internet, as well as other entertainment activities.

These in-flight entertainment systems may include screens that are shared or individual screens for passengers. When personal display screens are present, a passenger may choose movies or other shows to watch on the personal display screen independently of other passengers.

Even with the different amenities currently available, other amenities may still be desirable for passengers. Additional amenities may be desirable for long flights, such as intercontinental flights or coast-to-coast flights.

Therefore, it would be desirable to have a method and apparatus that takes into account at least some of the issues discussed above, as well as other possible issues.

SUMMARY

An illustrative embodiment of the present disclosure provides an apparatus comprising a display system and an information identifier. The display system is in a passenger cabin of an aircraft. The information identifier is configured to identify in-flight passenger information for the flight of an aircraft during operation of the aircraft. The information identifier is further configured to display a timeline and the in-flight passenger information in association with the timeline on the display system during the operation of the aircraft.

In another illustrative embodiment, a method for displaying in-flight passenger information is provided. In-flight passenger information for flight of an aircraft is identified during operation of the aircraft. A timeline and the in-flight passenger information in association with the timeline are displayed on a display system during the operation of the aircraft.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIG. 10 is an illustration of a block diagram of a data processing system in accordance with an illustrative embodiment;

FIG. 11 is an illustration of a block diagram of an aircraft manufacturing and service method in accordance with an illustrative embodiment; and FIG. 12 is an illustration of a block diagram of an aircraft in which an illustrative embodiment may be implemented.

DETAILED DESCRIPTION

Figure 1:
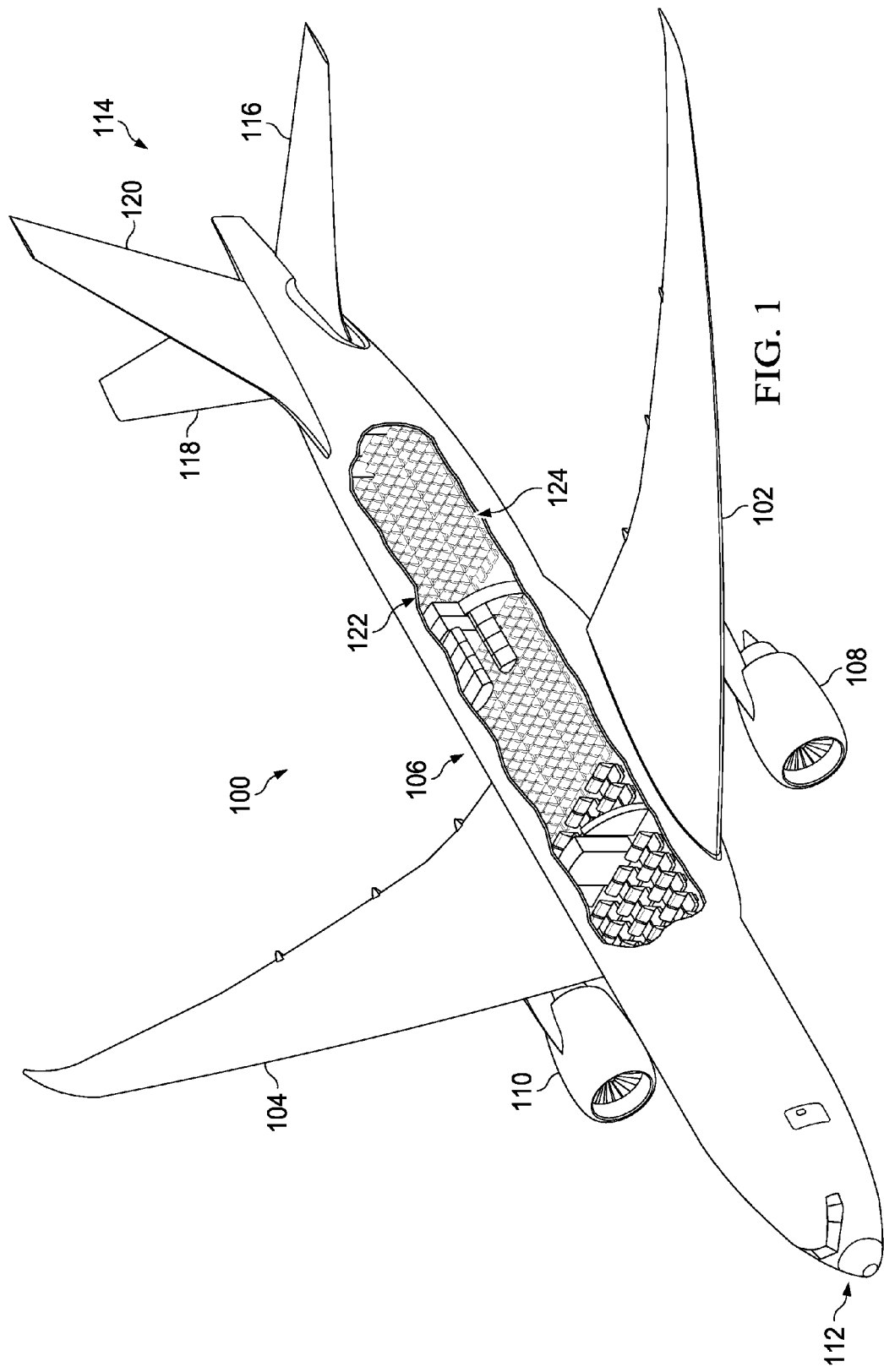
FIG. 1 is an illustration of an aircraft in accordance with an illustrative embodiment.

With reference now to the figures, and in particular, with reference to FIG. 1, an illustration of an aircraft is depicted in accordance with an illustrative embodiment. In this illustrative example, aircraft 100 has wing 102 and wing 104 attached to body 106. Aircraft 100 includes engine 108 attached to wing 102 and engine 110 attached to wing 104.

Body 106 has nose section 112 and tail section 114. Horizontal stabilizer 116, horizontal stabilizer 118, and vertical stabilizer 120 are attached to tail section 114 of body 106.

As can be seen in this illustrative example, passenger cabin 122 is located within body 106 of aircraft 100. Seats 124 are located within passenger cabin 122 in this exposed view of aircraft 100.

An illustrative embodiment may be implemented in aircraft 100 to provide passengers information within passenger cabin 122. In particular, in-flight information may be provided to passengers in passenger cabin 122. Information may be provided through an in-flight passenger information system implemented in aircraft 100 in accordance with an illustrative embodiment.

Figure 2:
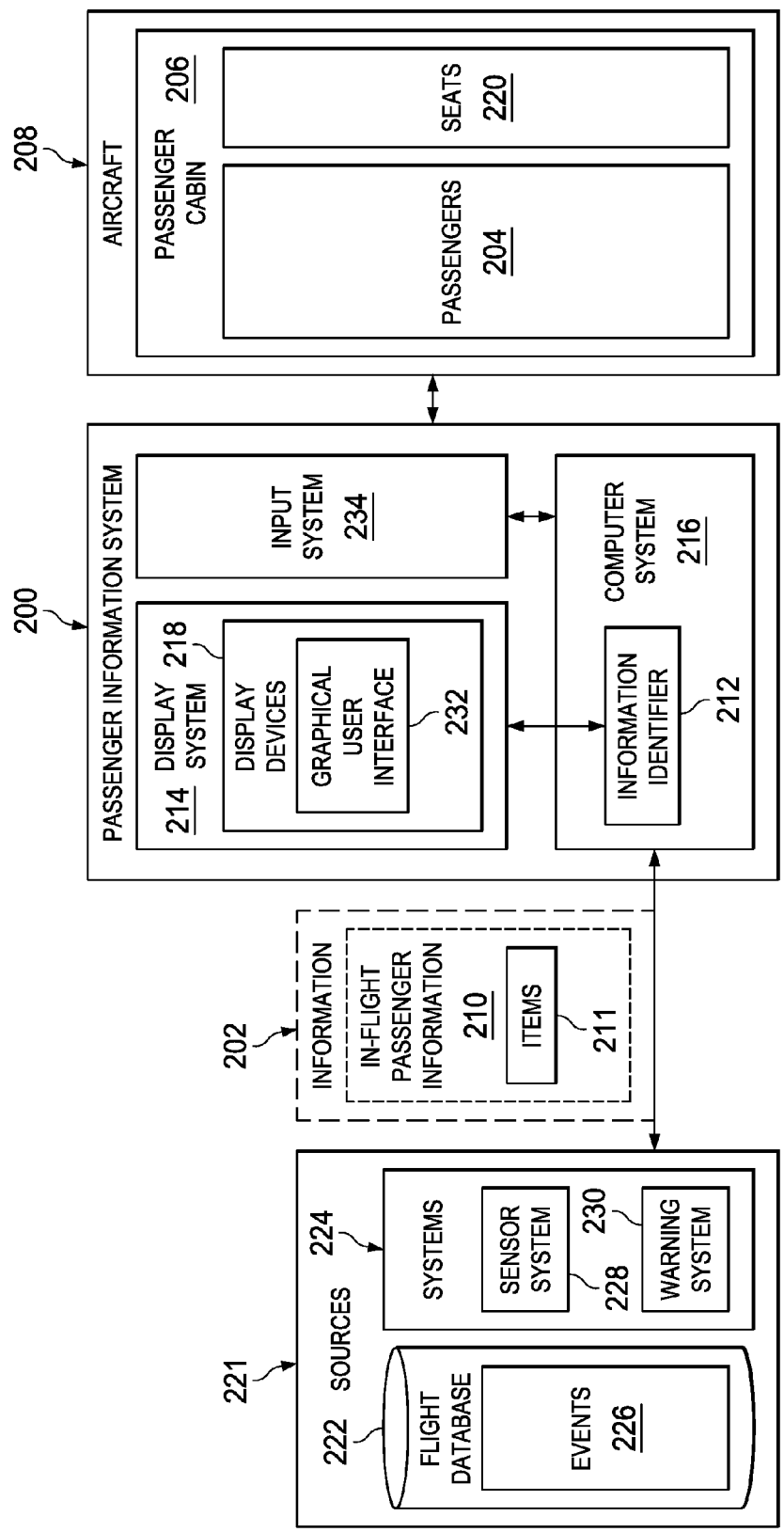
FIG. 2 is an illustration of a block diagram of a passenger environment in accordance with an illustrative embodiment.

With reference now to FIG. 2, an illustration of a block diagram of a passenger environment is depicted in accordance with an illustrative embodiment. In this illustrative example, passenger information system 200 may be implemented within aircraft 100 in FIG. 1.

As depicted, passenger information system 200 is configured to provide information 202 to passengers 204 in passenger cabin 206 of aircraft 208.

In these illustrative examples, information 202 may take various forms. For example, information 202 may be in-flight passenger information 210. In-flight passenger information 210 is information relating to the flight of aircraft 208. In particular, in-flight passenger information 210 may be any information that passengers 204 view during the operation of aircraft 208. Further, in-flight passenger information 210 may include information used by passengers 204 to plan various activities while in passenger cabin 206. For example, in-flight passenger information 210 includes items 211. Items 211 may include at least one of a take-off time, a landing time, a food-service, beverage service, a movie schedule, seatbelt usage, device usage, availability of lavatories, real-time cabin activity, or other suitable information.

As used herein, the phrase "at least one of," when used with a list of items, means different combinations of one or more of the listed items may be used and only one of each item in the list may be needed. For example, "at least one of item A, item B, or item C" may include, without limitation, item A, item A and item B, or item B. This example also may include item A, item B, and item C or item B and item C. Of course, any combinations of these items may be present. In other examples, "at least one of" may be, for example, without limitation, two of item A, one of item B, and ten of item C; four of item B and seven of item C; and other suitable combinations. The item may be a particular object, thing, or a category. In other words, at least one of means any combination of items and number of items may be used from the list but not all of the items in the list are required.

As depicted, beverage service may indicate what type of beverage services will be offered on a per passenger row basis from takeoff until flight. Real-time cabin activity may display information about activity within passenger cabin 206 during operation of aircraft 208. Real-time cabin activity may include one of occupancy of a galley, occupancy of one or more lavatories in a specific section of aircraft 208, seatbelts engaged, passengers 204 watching movies, passengers 204 meeting, and other suitable activities. Of course, the examples listed are only meant to be illustrative examples and not to limit the type of information that may form in-flight passenger information 210.

In this illustrative example, passenger information system 200 includes a number of different components. As depicted, passenger information system 200 includes information identifier 212 and display system 214.

Information identifier 212 is configured to identify information 202 and, in particular, in-flight passenger information 210. In these illustrative examples, information identifier 212 may be implemented in software, hardware, firmware or a combination thereof. When software is used, the operations performed by information identifier 212 may be implemented in program code configured to run on a processor unit. When firmware is used, the operations performed by information identifier 212 may be implemented in program code and data and stored in persistent memory to run on a processor unit. When hardware is employed, the hardware may include circuits that operate to perform the operations in information identifier 212.

In the illustrative examples, the hardware may take the form of a circuit system, an integrated circuit, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, a programmable array logic, a field programmable logic array, a field programmable gate array, and other suitable hardware devices. Additionally, the processes may be implemented in organic components integrated with inorganic components and/or may be comprised entirely of organic components excluding a human being. For example, the processes may be implemented as circuits in organic semiconductors.

In this illustrative example, information identifier 212 may be implemented in computer system 216. Computer system 216 is one or more computers. When more than one computer is present, those computers may be implemented with each other using a communications medium, such as a network.

Display system 214 is a hardware system and may include software. Display system 214 comprises display devices 218. In these illustrative examples, display devices 218 may be used with seats 220 in passenger cabin 206.

As depicted, each display device in display devices 218 is part of a seat in seats 220. For example, a display device may be located in a head rest of a seat in front of a passenger. Although each display device may be part of a seat, all seats may not have display devices in some illustrative examples. For example, some classes or levels of seating may not have display devices while others do have display devices.

As a result, each passenger in passengers 204 sitting in a seat in seats 220 may have a display device in display devices 218 to view information 202. In these illustrative examples, display devices 218 may be considered to be personal display devices for passengers 204.

As depicted, information identifier 212 identifies items 211 in in-flight passenger information 210 from a number of sources 221. As used herein, a "number of" when used with reference items means one or more items. For example, a number of sources is one or more different sources.

For example, information identifier 212 may identify in-flight passenger information 210 from at least one of flight database 222 and systems 224 and sources 221.

Flight database 222 may include information such as events 226. As depicted, flight database 222 may be located in computer system 216. Flight database 222 may be located on aircraft 208 or in a remote location depending on the particular implementation.

Events 226 identify when the events occur during the flight of aircraft 208. For example, events 226 may include an identification of the time of occurrence of at least one of food service, beverage service, scheduled movies, a take-off time, a landing time, or other suitable events.

Systems 224 are systems in aircraft 208. In these illustrative examples, these systems are hardware and may include software. For example, systems 224 may include sensor system 228. Sensor system 228 may, for example, monitor lavatories to determine whether the lavatories are occupied. This type of information may be sent to information identifier 212.

As another example, systems 224 also may include warning system 230. Warning system 230 may include, for example, a system that indicates when seatbelts should be fastened. Seatbelts may be fastened during take-off, landing, turbulence, and other times.

In the illustrative example, information identifier 212 displays information 202, such as in-flight passenger information 210 in graphical user interface 232 on display devices 218 in display system 214.

As depicted, in-flight passenger information 210 is displayed during operation of aircraft 208. The operation of aircraft 208 may be any time during which passengers 204 are present in passenger cabin 206 or other times depending on the particular implementation. For example, the operation of aircraft 208 may include at least one of aircraft 208 at a gate, taxiing, taking off, level flight, landing, and other times when passengers 204 may be present in passenger cabin 206 of aircraft 208.

Further, in some illustrative examples, passengers 204 may interact with graphical user interface 232. This interaction may be used to identify particular pieces of in-flight passenger information 210 that may be desired by particular passengers.

The interaction may occur using input system 234. Input system 234 also may be part of seats 220 in this illustrative example. As depicted, input system 234 may receive user input requesting to select in-flight passenger information 210. In other words, the user input may select particular types or pieces of in-flight passenger information 210.

Input system 234 may take various forms depending on the particular implementation. For example, input system 234 may include buttons, a touchscreen, a trackball, and other user input devices. When a touchscreen is present, the touchscreen may be implemented as part of display devices 218. In some cases, these devices may be separate from seats 220.

Further, graphical user interface 232 may be customized for each seat in seats 220, each passenger in a seat in seats 220, or some combination thereof. Flight database 222 may include information about passengers and services available to those passengers as well as their seat locations.

For example, information identifier 212 may identify a seat in seats 220 in which a passenger in passengers 204 is seated. This seat location may be used to identify a class of service for the passenger. In particular, services such as beverage service, meal service, movies, and other services may vary depending on the class of service. The seat location may be used to identify the class of service. Further, individual passengers may purchase various services separate from others in the same class of service. This identification also may be made by information identifier 212 using flight database 222.

As depicted, information identifier 212 may identify in-flight passenger information 210 for use in generating graphical user interface 232 particular for at least one of a particular passenger or a particular seat location for display. Thus, in-flight passenger information 210 is customized for the passenger or the seat location.

As a result, in-flight passenger information 210 may be customized for a particular passenger, seat location, or both, to reflect services that that passenger, seat location or both receive. This customization may provide a passenger additional information about the flight of aircraft 208 for use in planning different activities.

In this manner, passengers 204 may be able to obtain in-flight passenger information 210 to allow them to know more about services that may be available during the flight of aircraft 208. For example, knowing when meal and beverage services are offered may allow a passenger to know when an aisle may be blocked by a galley cart. Further, a passenger may know when to sleep to avoid missing meal and beverage services. In this manner, a passenger may better schedule activities during the flight of aircraft 208.

Figure 3:
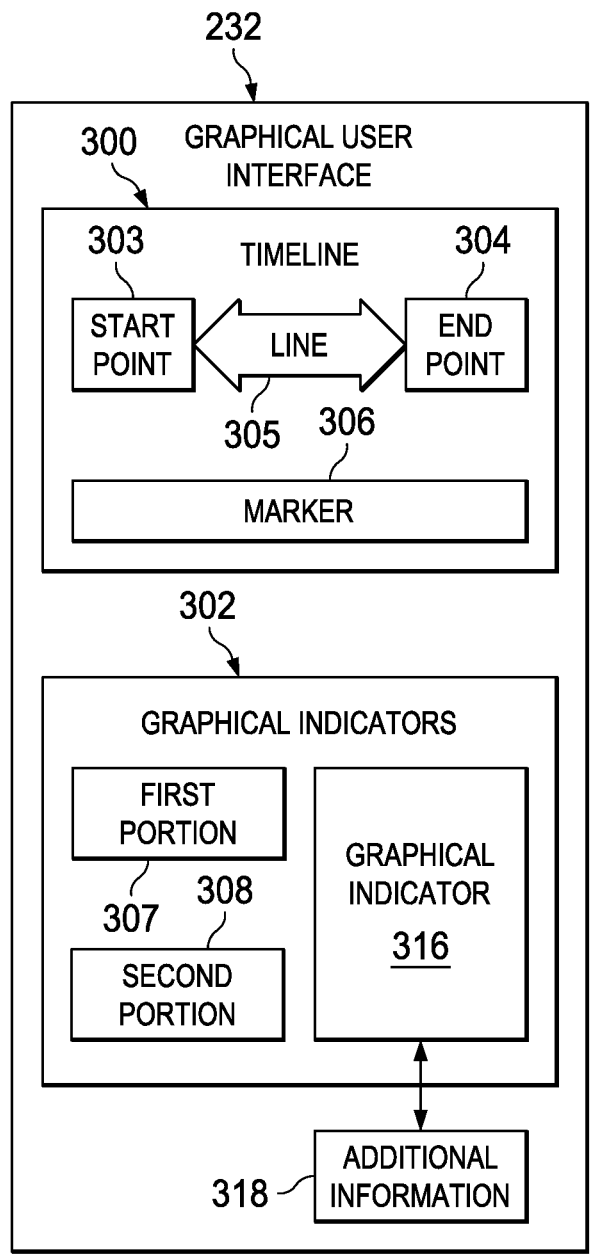
FIG. 3 is an illustration of a block diagram of in-flight passenger information displayed in a graphical user interface in accordance with an illustrative embodiment.

Turning next to FIG. 3, an illustration of a block diagram of in-flight passenger information displayed in a graphical user interface is depicted in accordance with an illustrative embodiment. As depicted, one manner in which in-flight passenger information 210 may be displayed in graphical user interface 232 is shown.

As can be seen in this illustrative example, graphical user interface 232 may have a number of different components. These components include timeline 300 and graphical indicators 302.

As depicted, timeline 300 is a graphical element. Timeline 300 is configured to organize information into a chronology. In other words, timeline 300 may be used to organize items 211 in in-flight passenger information 210 based on when items 211 in in-flight passenger information 210 occur in time.

In this particular example, timeline 300 includes start point 303, end point 304, and line 305. Line 305 connects start point 303 to end point 304. Additionally, timeline 300 also may have marker 306. Marker 306 may indicate a current time along line 305 for timeline 300.

Graphical indicators 302 are displayed in graphical user interface 232. Graphical indicators 302 are graphical representations of items 211 in in-flight passenger information 210 in this illustrative example.

As depicted, first portion 307 of graphical indicators 302 represent items 211 in in-flight passenger information 210 that are scheduled at different times. First portion 307 of graphical indicators 302 are displayed in association with timeline 300. A graphic indicator may be considered to be associated with timeline 300 when the graphical indicator is displayed in a location relative to timeline 300 that draws attention to timeline 300. For example, a graphical indicator may be displayed on at least one of start point 303, end point 304, and line 305 of timeline 300.

In these illustrative examples, a graphical indicator in graphical indicators 302 may take various forms. For example, a graphical indicator may be selected from at least one of an icon, a bitmap, text, a number, a symbol, bolding, animation, a color, or other suitable types of indicators.

Some of items 211 may not be scheduled in a manner that is appropriate for display in association with timeline 300. For example, lavatory occupancy, seatbelt warnings, and other information may be in items 211 in in-flight passenger information 210 but not as a scheduled item that may be shown on timeline 300. These items may be displayed in second portion 308 of graphical indicators 302 in graphical user interface 232. Second portion 308 of graphical indicators 302 may not be displayed in association with timeline 300 within graphical user interface 232.

In these illustrative examples, some or all of graphical indicators 302 may be selectable. For example, graphical indicator 316 in graphical indicators 302 may be made selectable as a hotspot. This hotspot for graphical indicator 316 may not be visually distinct from other graphical indicators in graphical indicators 302 that may not be selectable.

The selection of graphical indicator 316 in graphical indicators 302 that is a hotspot may result in additional information 318 about the particular item represented by graphical indicator 316 being displayed in graphical user interface 232. Additional information 318 may be displayed in various ways. For example, additional information 318 may be displayed as at least one of a pop-up window, a tooltip, a balloon, another graphical indicator, or in some other suitable manner. These different graphical elements may include text or other graphical representations for additional information 318.

Further, information identifier 212 is configured to customize a display of timeline 300 and in-flight passenger information 210 using graphical indicators 302 in association with timeline 300 on display system 214 in graphical user interface 232 with in-flight passenger information 210 for a particular passenger in a particular seat for display on a display device for the passenger.

The illustration of passenger information system 200 in FIGS. 2-3 are not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, the different components in passenger information system 200 may be implemented as part of an in-flight entertainment system in aircraft 208. In yet another illustrative example, passenger information system 200 may display in-flight passenger information 210 on devices owned by passengers. For example, in-flight passenger information 210 may be displayed on other display devices in addition to or in place of display devices 218 that are part of seats 220. For example, in one illustrative example, display devices 218 may comprise at least one of a smart phone, a tablet computer, a laptop computer or some other suitable device.

Additionally, passenger information system 200 may also display other types of information other than in-flight passenger information 210. For example, information such as a map of the destination airport, advertising, information about the destination, identification of landmarks over which aircraft 208 flies, weather, and other suitable information also may be displayed. The advertising may include, for example, car rentals, hotels, and other types of advertisements. The identification of landmarks may include an identification of cities, lakes, mountains, and other landmarks that may be of interest. The information about the landmarks may include aerial pictures, information of interest about the landmarks, and other suitable types of information.

As another example, although systems 224 show sensor system 228 and warning system 230 at sources 221 of identifying information 202, such as in-flight passenger information 210, information 202 may be identified from other systems other than the ones illustrated. For example, information identifier 212 may identify in-flight passenger information 210 from a navigation computer. For example, current location of aircraft 208, and other flight information may be identified from the navigation computer in systems 224.

As another example, although information identifier 212 is shown as a single component, information identifier 212 may be distributed in different locations. For example, information identifier 212 may be located in display system 214 in addition to or in place of computer system 216. The different locations may provide different functions for information identifier 212.

Figure 4:
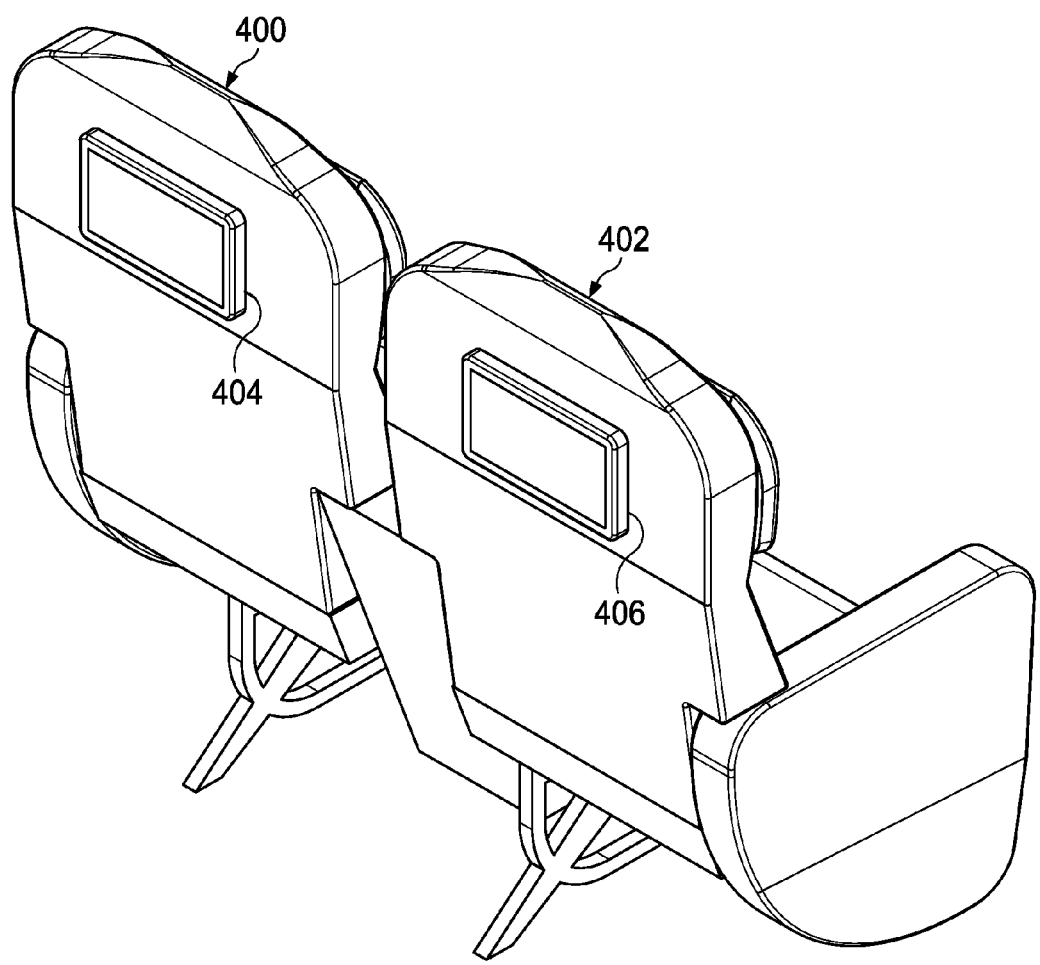
FIG. 4 is an illustration of seats in an aircraft for displaying passenger information in accordance with an illustrative embodiment.

With reference next to FIG. 4, an illustration of seats in an aircraft for displaying passenger information is depicted in accordance with an illustrative embodiment. As depicted, seat 400 and seat 402 are examples of seats in seats 124 in passenger cabin 122 in FIG. 1. The seats are examples of physical implementations for seats 220 shown in block form in FIG. 2.

As depicted, seat 400 has display device 404, and seat 402 has display device 406. These display devices are examples of physical implementations for display devices 218 in display system 214 shown in block form in FIG. 2.

Display device 404 and display device 406 may be used to display in-flight passenger information. Additionally, display device 404 and display device 406 may be used to provide entertainment in an in-flight entertainment system.

Figure 5:
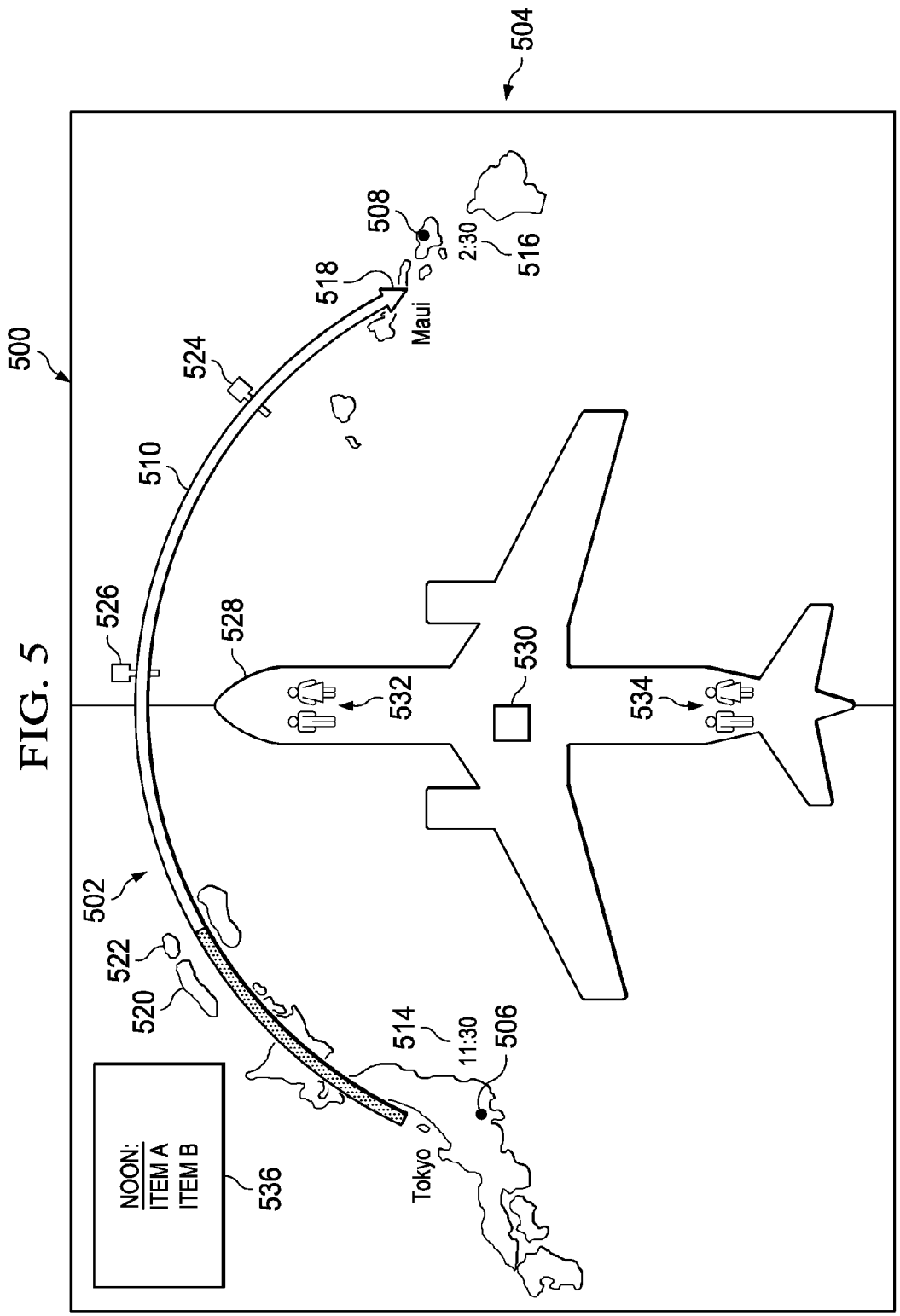
FIG. 5 is an illustration of a graphical user interface in accordance with an illustrative embodiment.

Turning next to FIG. 5, an illustration of a graphical user interface is depicted in accordance with an illustrative embodiment. Graphical user interface 500 is an example of an implementation for graphical user interface 232 shown in block form in FIG. 2 and in FIG. 3.

Graphical user interface 500 is an example of a graphical user interface that may be displayed within display devices 218 in display system 214 shown in block form in FIG. 2. Graphical user interface 500 also may be displayed on display device 404 and display device 406 as shown in FIG. 4.

As depicted, graphical user interface 500 includes a number of graphical elements. These graphical elements are used to convey in-flight passenger information to a passenger during operation of an aircraft.

As depicted, graphical user interface 500 includes timeline 502 and graphical indicators 504. Timeline 502 comprises start point 506 and end point 508. Line 510 connects start point 506 and end point 508. As depicted, start point 506 is a graphical representation of a geographic area in which the flight starts. As depicted, the geographic area is an island emphasizing the originating city of the flight. End point 508 indicates a city in a geographic region where the flight ends. In this example, end point 508 is an island with the destination city emphasized.

In this illustrative example, time 514 in graphical indicators 504 is displayed in association with start point 506. Time 514 identifies a departure time for the flight. Alternatively, time 516 is displayed in association with end point 508. Time 516 identifies an arrival time for the flight. Line 510 is curved and has arrowhead 518 to indicate travel from start point 506 and end point 508.

In this illustrative example, location marker 520 in graphical indicators 504 is displayed in association with timeline 502. In particular, location marker 520 indicates a current progress of the flight.

Beverage marker 522 and beverage marker 524 in graphical indicators 504 are displayed in association with timeline 502. These two markers indicate a time when a beverage service will occur during the flight. Meal marker 526 in graphical indicators 504 also is displayed in association with timeline 502. Meal marker 526 indicates a time when a meal service will occur.

In this particular example, aircraft 528 in graphical indicators 504 is displayed with other graphical indicators to provide a passenger with information about the aircraft. For example, seat 530 in graphical indicators 504 is displayed in a location within aircraft 528 to illustrate the location of the passenger within aircraft 528.

As depicted, lavatory 532 and lavatory 534 in graphical indicators 504 are shown located at the front portion and back portion of aircraft 528. In this manner, a passenger may see their relative location at seat 530 to the location of lavatory 532 and lavatory 534 in aircraft 528. In this illustrative example, lavatory 532 is displayed as being unavailable for use, while lavatory 534 is displayed as being available for use.

In this illustrative example, meal marker 526 may be a selectable graphical indicator. Meal marker 526 may be selected to provide more in-flight passenger information 210 about the meal service. In this illustrative example, a selection of meal marker 526 results in pop-up window 536 being displayed. Pop-up window 536 provides a time and items that are available for the meal service. These items and times may be specific for the passenger in seat 530.

The illustration of graphical user interface 500 in FIG. 5 is only meant as an example of one implementation for graphical user interface 232 shown in block form in FIG. 2. For example, start point 506 and end point 508 may take other forms other than graphical representation of geographic regions. For example, circles, squares, and other polygons may be used to represent start point 506 and end point 508.

In yet another illustrative example, particular attention may be brought to information through the use of animation in addition to the different graphical elements displayed above. As yet another example, graphical indicators 504 and other graphical indicators may be selectable by a passenger. For example, the selection of end point 508 may result in a pop-up window displaying an estimated time of arrival, a baggage claim site, and other suitable information about the destination of the flight.

Graphical user interface 500 may be different for different seats within an aircraft. Different seats with different levels of service or amenities may have different in-flight passenger information displayed. The in-flight passenger information displayed may be that for services and amenities available for the particular seat in which the passenger is located. In this manner, the display of graphical user interface 500 may be customized for particular seats. The seats may vary depending on the class of service or particular amenities in the same class of service that may have been purchased by a particular passenger.

Figure 6:
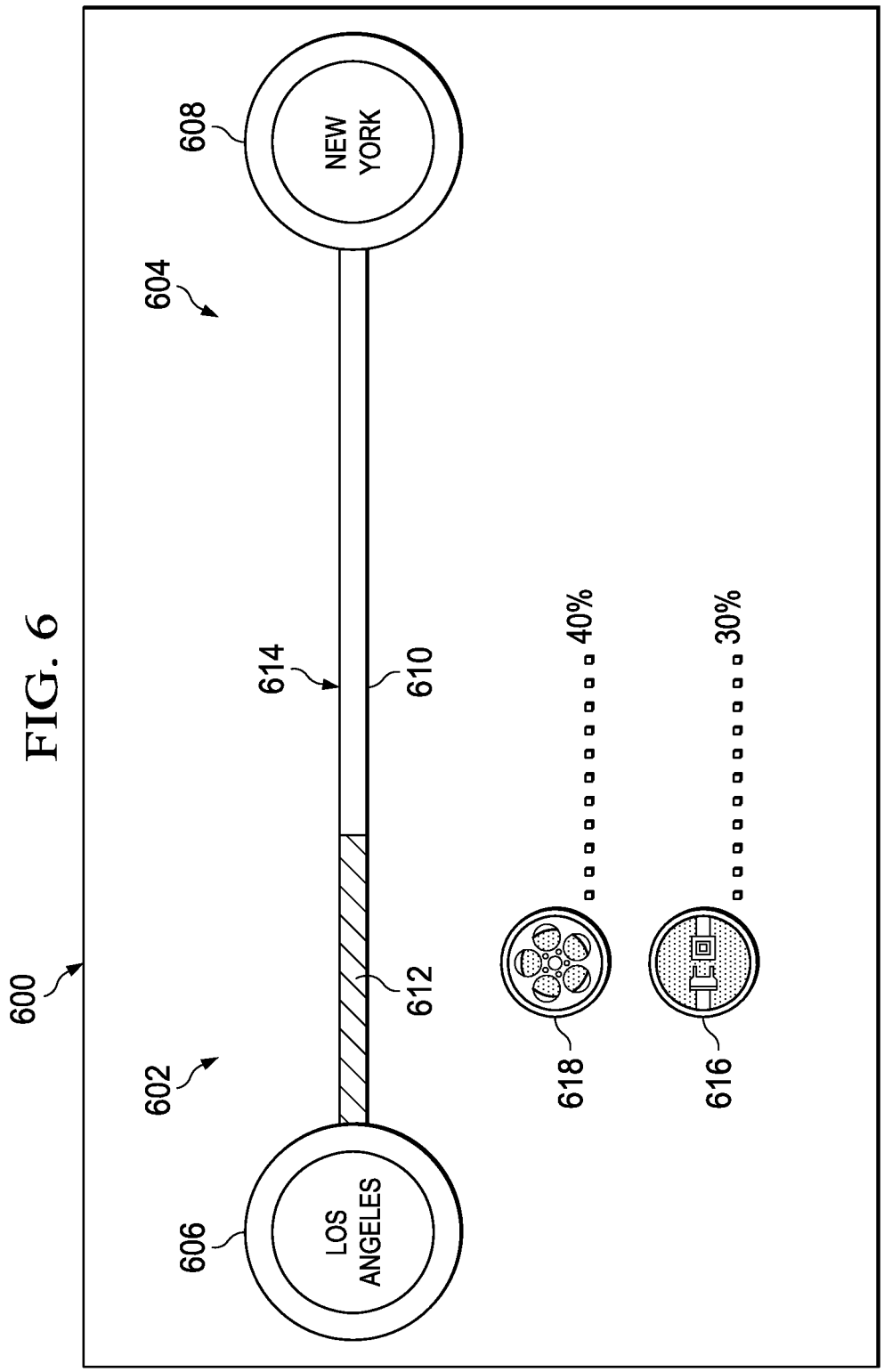
FIG. 6 is another illustration of a graphical user interface in accordance with an illustrative embodiment.

With reference next FIG. 6, another illustration of a graphical user interface is depicted in accordance with an illustrative embodiment. In this illustrative example, graphical user interface 600 is another example of an implementation for graphical user interface 232 illustrated in block form in FIG. 2 and FIG. 3.

Graphical user interface 600 is an example of a graphical user interface that may be displayed within display devices 218 in display system 214 shown in block form in FIG. 2. Graphical user interface 600 also may be displayed on display device 404 and display device 406 as shown in FIG. 4.

Graphical user interface 600 includes a number of different graphical elements. As depicted, graphical user interface 600 includes timeline 602 and graphical indicators 604.

Timeline 602 has start point 606 connected to end point 608 by line 610. As depicted, start point 606 is a circle with text identifying the origination city for the flight. End point 608 is a circle with text identifying the destination city of the flight. Bar 612 in graphical indicators 604 illustrates the progress of the flight.

In this example, beverage marker 614 indicates when a beverage service occurs for the flight. Seatbelt marker 616 indicates a percentage of passengers wearing seatbelts in the seats. Movie marker 618 indicates a percentage of passengers watching movies at their seats.

The illustration of graphical user interface 600 is only meant as yet another example of an implementation for graphical user interface 232 shown in block form in FIG. 2. In yet other illustrative examples, other graphical elements may be used in addition to or in place of ones depicted for graphical user interface 600 in FIG. 6. For example, although none of graphical indicators 604 has been described as selectable, one or more of graphical indicators 604 may be selectable to provide additional in-flight passenger information. In other illustrative examples, start point 606 may represent an origination airport, and end point 608 may represent a destination airport.

Thus, graphical user interface 500 in FIG. 5 and graphical user interface 600 in FIG. 6 may be used by passengers to plan activities on an aircraft. Of course, other information may be displayed that may not be relevant to planning activities on the aircraft. For example, the temperature of the destination city, the temperature outside of the aircraft, the current location of the aircraft, and other information of interest may be displayed as in-flight passenger information 210 in some illustrative examples.

Figure 7:
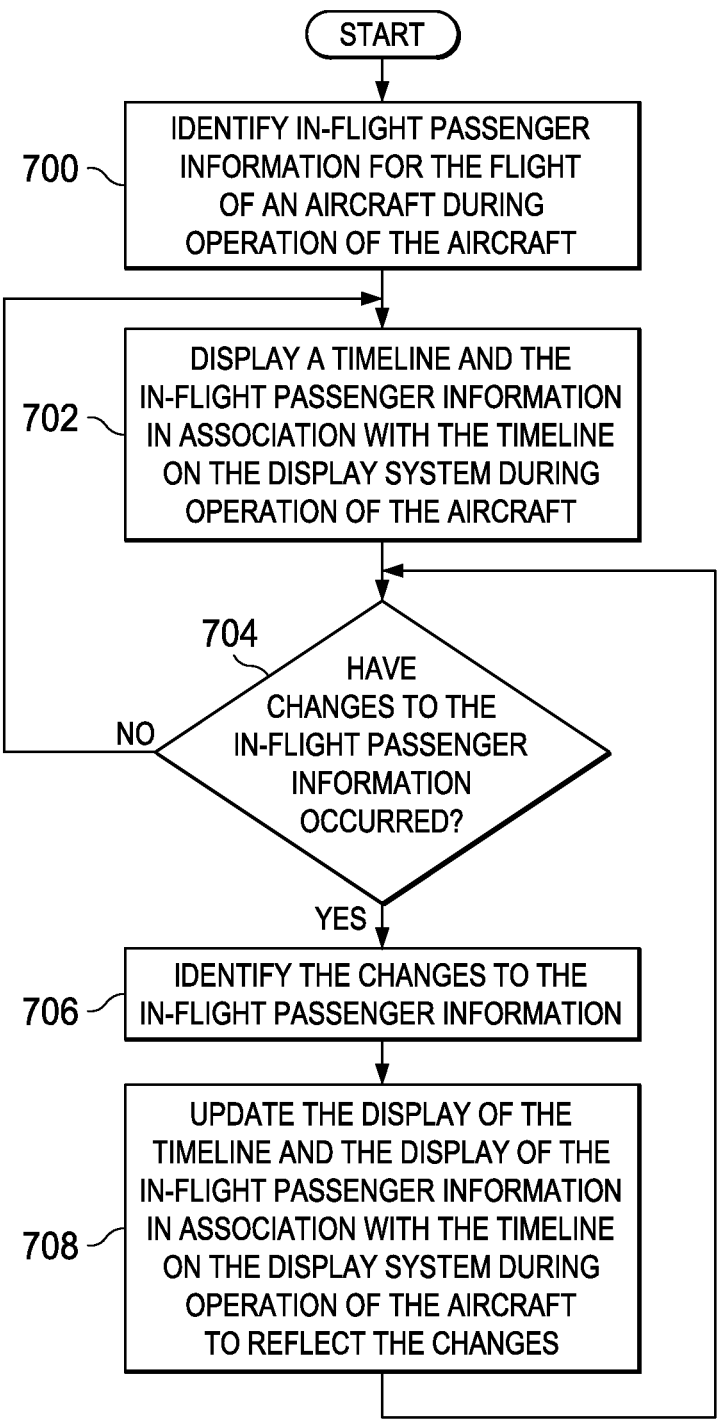
FIG. 7 is an illustration of a flowchart of a process for displaying in-flight passenger information in accordance with an illustrative embodiment.

With reference now to FIG. 7, an illustration of a flowchart of a process for displaying in-flight passenger information is depicted in accordance with an illustrative embodiment. The process illustrated in FIG. 7 may be implemented in passenger information system 200 in FIG. 2. One or more of the different operations may be implemented using information identifier 212 in FIG. 2.

The process begins by identifying in-flight passenger information for the flight of an aircraft during operation of the aircraft (operation 700). The process then displays a timeline and the in-flight passenger information in association with the timeline on the display system during operation of the aircraft (operation 702).

A determination is made as to whether changes to the in-flight passenger information have occurred as the flight of aircraft progresses (operation 704). If changes have occurred to in-flight passenger information, the changes to the in-flight passenger information are identified (operation 706). The process then updates the display of the timeline and the display of the in-flight passenger information in association with the timeline on the display system during operation of the aircraft to reflect the changes (operation 708). Thereafter, the process returns to operation 704.

With reference in operation 704, if a change has not occurred to the in-flight passenger information, the process returns to operation 702. This process may continue until the flight ends or some other action is taken to the display.

Figure 8:
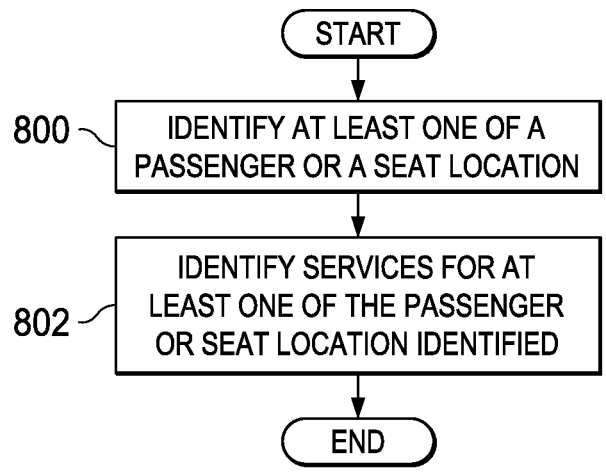
FIG. 8 is an illustration of a flowchart of a process for identifying in-flight passenger information in accordance with an illustrative embodiment.

Turning next to FIG. 8, an illustration of a flowchart of a process for identifying in-flight passenger information is depicted in accordance with an illustrative embodiment. The process illustrated in FIG. 8 is an example of a process that may be used to customize in-flight passenger information for at least one of a particular passenger or a particular seat. The process may be implemented by information identifier 212 in passenger information system 200.

The process identifies at least one of a passenger or a seat location (operation 800). The process then identifies services for at least one of the passenger or seat location identified (operation 802) with the process terminating thereafter.

Figure 9:
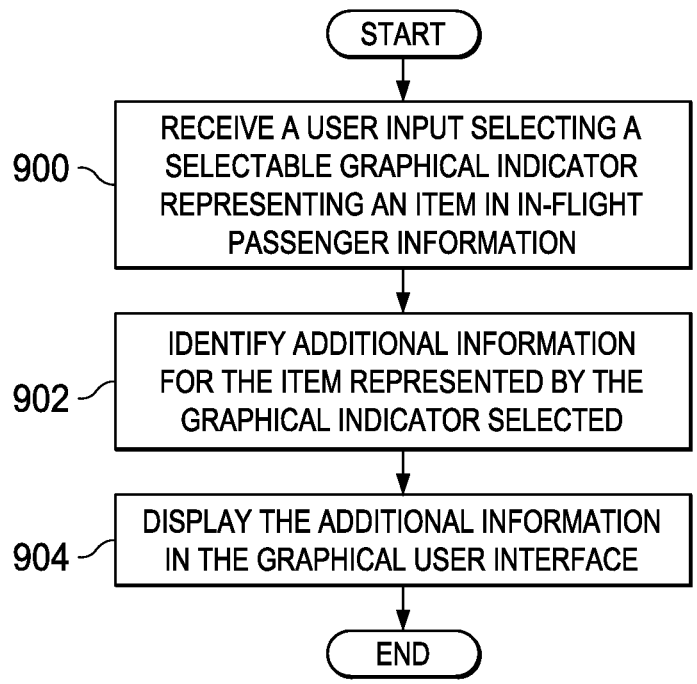
FIG. 9 is an illustration of a flowchart of a process for displaying additional information about an item in in-flight passenger information in accordance with an illustrative embodiment.

In FIG. 9, an illustration of a flowchart of a process for displaying additional information about an item in in-flight passenger information is depicted in accordance with an illustrative embodiment. The process illustrated in FIG. 9 may be implemented in information identifier 212. This process may be implemented to identify additional information for in-flight information represented by a graphical indicator.

The process begins by receiving a user input selecting a selectable graphical indicator representing an item in in-flight passenger information (operation 900). The item may be, for example, beverage service, meal service, or some other item with respect to in-flight passenger information being displayed on a graphical user interface using graphical indicators.

The process identifies additional information for the item represented by the graphical indicator selected (operation 902). The process then displays the additional information in the graphical user interface (operation 904) with the process terminating thereafter.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent a module, a segment, a function, and/or a portion of an operation or step. For example, one or more of the blocks may be implemented as program code, in hardware, or a combination of the program code and hardware. When implemented in hardware, the hardware may, for example, take the form of integrated circuits that are manufactured or configured to perform one or more operations in the flowcharts or block diagrams. When implemented as a combination of program code and hardware, the implementation may take the form of firmware.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

Turning now to FIG. 10, an illustration of a block diagram of a data processing system is depicted in accordance with an illustrative embodiment. Data processing system 1000 may be used to implement computer system 216 in FIG. 2. In this illustrative example, data processing system 1000 includes communications framework 1002, which provides communications between processor unit 1004, memory 1006, persistent storage 1008, communications unit 1010, input/output (I/O) unit 1012, and display 1014. In this example, communication framework may take the form of a bus system.

Processor unit 1004 serves to execute instructions for software that may be loaded into memory 1006. Processor unit 1004 may be a number of processors, a multi-processor core, or some other type of processor, depending on the particular implementation.

Memory 1006 and persistent storage 1008 are examples of storage devices 1016. A storage device is any piece of hardware that is capable of storing information, such as, for example, without limitation, data, program code in functional form, and/or other suitable information either on a temporary basis and/or a permanent basis. Storage devices 1016 may also be referred to as computer readable storage devices in these illustrative examples. Memory 1006, in these examples, may be, for example, a random access memory or any other suitable volatile or non-volatile storage device. Persistent storage 1008 may take various forms, depending on the particular implementation.

For example, persistent storage 1008 may contain one or more components or devices. For example, persistent storage 1008 may be a hard drive, a flash memory, a rewritable optical disk, a rewritable magnetic tape, or some combination of the above. The media used by persistent storage 1008 also may be removable. For example, a removable hard drive may be used for persistent storage 1008.

Communications unit 1010, in these illustrative examples, provides for communications with other data processing systems or devices. In these illustrative examples, communications unit 1010 is a network interface card.

Input/output unit 1012 allows for input and output of data with other devices that may be connected to data processing system 1000. For example, input/output unit 1012 may provide a connection for user input through a keyboard, a mouse, and/or some other suitable input device. Further, input/output unit 1012 may send output to a printer. Display 1014 provides a mechanism to display information to a user.

Instructions for the operating system, applications, and/or programs may be located in storage devices 1016, which are in communication with processor unit 1004 through communications framework 1002. The processes of the different embodiments may be performed by processor unit 1004 using computer-implemented instructions, which may be located in a memory, such as memory 1006.

These instructions are referred to as program code, computer usable program code, or computer readable program code that may be read and executed by a processor in processor unit 1004. The program code in the different embodiments may be embodied on different physical or computer readable storage media, such as memory 1006 or persistent storage 1008.

Program code 1018 is located in a functional form on computer readable media 1020 that is selectively removable and may be loaded onto or transferred to data processing system 1000 for execution by processor unit 1004. Program code 1018 and computer readable media 1020 form computer program product 1022 in these illustrative examples. In one example, computer readable media 1020 may be computer readable storage media 1024 or computer readable signal media 1026.

In these illustrative examples, computer readable storage media 1024 is a physical or tangible storage device used to store program code 1018 rather than a medium that propagates or transmits program code 1018.

Alternatively, program code 1018 may be transferred to data processing system 1000 using computer readable signal media 1026. Computer readable signal media 1026 may be, for example, a propagated data signal containing program code 1018. For example, computer readable signal media 1026 may be an electromagnetic signal, an optical signal, and/or any other suitable type of signal. These signals may be transmitted over communications links, such as wireless communications links, optical fiber cable, coaxial cable, a wire, and/or any other suitable type of communications link.

The different components illustrated for data processing system 1000 are not meant to provide architectural limitations to the manner in which different embodiments may be implemented. The different illustrative embodiments may be implemented in a data processing system including components in addition to and/or in place of those illustrated for data processing system 1000. Other components shown in FIG. 10 can be varied from the illustrative examples shown. The different embodiments may be implemented using any hardware device or system capable of running program code 1018.

Illustrative embodiments of the disclosure may be described in the context of aircraft manufacturing and service method 1100 as shown in FIG. 11 and aircraft 1200 as shown in FIG. 12. Turning first to FIG. 11, an illustration of an aircraft manufacturing and service method is depicted in accordance with an illustrative embodiment. During pre-production, aircraft manufacturing and service method 1100 may include specification and design 1102 of aircraft 1200 in FIG. 12 and material procurement 1104.

During production, component and subassembly manufacturing 1106 and system integration 1108 of aircraft 1200 in FIG. 12 takes place. Thereafter, aircraft 1200 in FIG. 12 may go through certification and delivery 1110 in order to be placed in service 1112. While in service 1112 by a customer, aircraft 1200 in FIG. 12 is scheduled for routine maintenance and service 1114, which may include modification, reconfiguration, refurbishment, and other maintenance or service.

Each of the processes of aircraft manufacturing and service method 1100 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 12, an illustration of an aircraft is depicted in which an illustrative embodiment may be implemented. In this example, aircraft 1200 is produced by aircraft manufacturing and service method 1100 in FIG. 11 and may include airframe 1202 with plurality of systems 1204 and interior 1206. Examples of systems 1204 include one or more of propulsion system 1208, electrical system 1210, hydraulic system 1212, and environmental system 1214. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 1100 in FIG. 11.

One or more illustrative embodiments may be implemented during system integration 1108 to provide a passenger information system for aircraft 1200. In one illustrative example, a passenger information system may provide in-flight passenger information to passengers during the flight of aircraft 1200 when aircraft 1200 is in service 1112. As another illustrative example, a passenger information system may be added to aircraft 1200 during maintenance and service 1114. The passenger information system may be added or upgraded to include features of the illustrative embodiments during maintenance, refit, upgrades, and other operations during maintenance and service 1114.

Thus, the illustrative embodiments provide a method and apparatus for displaying information such as in-flight passenger information. With in-flight passenger information, passengers may be able to obtain information about services that occur during the flight. Additionally, passengers may also obtain information about events. In this manner, passengers may more easily plan activities during the flight.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An apparatus comprising:
   a display system in a passenger cabin of an aircraft, wherein the display system comprises a plurality of display devices associated with a plurality of seats, wherein each of the plurality of display devices is associated with a number of the plurality of seats;
   a processor configured to execute an information identifier configured to identify in-flight passenger information for flight of the aircraft during operation of the aircraft and simultaneously displays a timeline and the in-flight passenger information in association with the timeline on the display system during the operation of the aircraft, wherein the in-flight passenger information includes both seat-specific information and real-time cabin activity information, the seat-specific information associated to each of the number of the plurality of seats and including a timing of food-service, a timing of beverage-service and a passenger seat location within the aircraft, and the real-time cabin activity information including a take-off time, a landing time and availability of lavatories.

2. The apparatus of claim 1, wherein the information identifier is configured to display the timeline and the in-flight passenger information in association with the timeline in a graphical user interface on the display system during the flight of the aircraft.

3. The apparatus of claim 1, wherein the timeline has a start point, an end point, and a line extending from the start point to the end point.

4. The apparatus of claim 3, wherein the start point represents an origination airport and the end point represents a destination airport.

5. The apparatus of claim 1 further comprising:
   an input system comprising a plurality of input devices associated with the plurality of seats, wherein each of the plurality of input devices is associated with the number of the plurality of seats.

6. The apparatus of claim 5, wherein the input system is configured to receive user input requesting to select the in-flight passenger information.

7. The apparatus of claim 2, wherein the information identifier is configured to customize a display of the timeline and the in-flight passenger information in association with the timeline in the graphical user interface on the display system, wherein the in-flight passenger information includes seat-specific information, the seat-specific information comprising information for at least one of a particular passenger or a particular seat for the display.

8. The apparatus of claim 1, wherein the display system further comprises at least one of a display device, a smart phone, a tablet computer, and a laptop computer.

9. The apparatus of claim 1, wherein the display system and the information identifier are part of an in-flight entertainment system associated with the aircraft.

10. The apparatus of claim 1, wherein the real-time cabin activity information further includes at least one of a movie schedule, seatbelt usage, and device usage.

11. A method for displaying in-flight passenger information, the method comprising:
    identifying the in-flight passenger information for flight of an aircraft during operation of the aircraft, wherein identifying the in-flight passenger information for the flight of the aircraft during the operation of the aircraft further comprises:
    identifying the in-flight passenger information for the flight of the aircraft during the operation of the aircraft from seat-specific information, the seat-specific information associated to each of a number of a plurality of seats and including a timing of food-service, a timing of beverage-service and a passenger seat location within the aircraft;
    identifying the in-flight passenger information for the flight of the aircraft during the operation of the aircraft from real-time cabin activity information, the real-time cabin activity information including a take-off time, a landing time, and availability of lavatories;
    simultaneously displaying a timeline and the in-flight passenger information including both the seat-specific information and the real-time cabin activity information in association with the timeline on a display system in a passenger cabin during the operation of the aircraft, wherein the display system comprises a plurality of display devices associated with the plurality of seats, wherein each of the plurality of display devices is associated with the number of the plurality of seats.

12. The method of claim 11 further comprising:
identifying changes to the in-flight passenger information as the flight of the aircraft progresses; and
updating a display of the timeline and the in-flight passenger information displayed in association with the timeline on the display system during the operation of the aircraft to reflect the changes.

13. The method of claim 11, wherein the in-flight passenger information includes seat-specific information, the seat-specific information comprising information for at least one of a particular passenger or a particular seat.

14. The method of claim 11, wherein the operation of the aircraft is during a flight of the aircraft.

15. The method of claim 11, wherein the timeline has a start point, an end point, and a line extending from the start point to the end point.

16. The method of claim 11, wherein identifying the in-flight passenger information for the flight of the aircraft during the operation of the aircraft, wherein the real-time cabin activity information further includes at least one of a movie schedule, seatbelt usage, and device usage.

* * * * *